US008870706B2

(12) United States Patent
Imamura et al.

(10) Patent No.: US 8,870,706 B2

(45) Date of Patent: Oct. 28, 2014

(54) VEHICULAR POWER TRANSMISSION DEVICE

(75) Inventors: Tomonori Imamura, Nagoya (JP); Shinichirou Koshimoto, Kariya (JP); Hiroshi Okada, Kariya (JP)

(73) Assignee: Denso Corporation, Kariya (JP)

( * ) Notice: Subject to any disclaimer, the term of this patent is extended or adjusted under 35 U.S.C. 154(b) by 165 days.

(21) Appl. No.: 13/192,795

(22) Filed: Jul. 28, 2011

(65) Prior Publication Data

US 2012/0028747 A1 Feb. 2, 2012

(30) Foreign Application Priority Data

Jul. 30, 2010 (JP) ................................ 2010-171882

(51) Int. Cl.

*F16H 3/72* (2006.01)
*B60K 6/48* (2007.10)
*B60K 6/365* (2007.10)
*F16H 3/54* (2006.01)

(52) U.S. Cl.

CPC ... *B60K 6/48* (2013.01); *F16H 3/54* (2013.01); *B60K 2006/4841* (2013.01); *F16H 3/725* (2013.01); *Y02T 10/7258* (2013.01); *B60K 2006/4816* (2013.01); *Y02T 10/6221* (2013.01); *B60K 6/365* (2013.01); *Y02T 10/6256* (2013.01)

USPC ............................................. 475/282; 475/5

(58) Field of Classification Search

USPC ............. 475/5, 280, 286, 288, 290, 282, 284

See application file for complete search history.

(56) References Cited

U.S. PATENT DOCUMENTS

| | | | |
|---|---|---|---|
| 7,387,585 B2 * | 6/2008 | Bucknor et al. | 475/5 |
| 2006/0111213 A1 * | 5/2006 | Bucknor et al. | 475/5 |
| 2006/0148605 A1 * | 7/2006 | Raghavan et al. | 475/5 |

(Continued)

FOREIGN PATENT DOCUMENTS

| | | |
|---|---|---|
| JP | 2000-279482 | 10/2000 |
| JP | 2008-114811 | 5/2008 |
| JP | 2008143242 | 6/2008 |
| JP | 2009-001234 | 1/2009 |

OTHER PUBLICATIONS

Notice of Reasons for Refusal issued for Japanese Patent Application No. 2010-171882, dated Aug. 16, 2013 with partial English Translation.

(Continued)

*Primary Examiner* — Troy Chambers

*Assistant Examiner* — Lillian Nguyen

(74) *Attorney, Agent, or Firm* — Nixon & Vanderhye P.C.

(57) ABSTRACT

Power generated by an engine is inputted to a carrier of a first planetary gear mechanism. Power generated by a motor is inputted to a sun gear of a second planetary gear mechanism. Power from a ring gear of the first planetary gear mechanism and power from a carrier of the second planetary gear mechanism are combined and transmitted to an axle of driving wheels. While power input from the engine to the carrier of the first planetary gear mechanism is maintained, rotation of a sun gear of the first planetary gear mechanism is restricted with a first clutch, a second clutch or a first brake. While power input from the motor to the sun gear of the second planetary gear mechanism is maintained, rotation of a ring gear of the second planetary gear mechanism is restricted with a second brake or a third clutch.

1 Claim, 6 Drawing Sheets

W2 W1 MG 9 3 7 8 Pm Pe 6 4 C2 2 1 5 C1 B1 11 C3 B2 13 12 14 14a 20 CONTROLLER

(56) References Cited

U.S. PATENT DOCUMENTS

| | | | | |
|---|---|---|---|---|
| 2006/0189428 | A1* | 8/2006 | Raghavan et al. | 475/5 |
| 2006/0234821 | A1* | 10/2006 | Bucknor et al. | 475/5 |
| 2006/0240928 | A1* | 10/2006 | Raghavan et al. | 475/5 |
| 2006/0240929 | A1* | 10/2006 | Raghavan et al. | 475/5 |
| 2007/0105678 | A1* | 5/2007 | Bucknor et al. | 475/5 |
| 2007/0298924 | A1* | 12/2007 | Bucknor et al. | 475/5 |
| 2008/0103003 | A1* | 5/2008 | Sah et al. | 475/5 |
| 2010/0273594 | A1* | 10/2010 | Sung | 475/5 |

OTHER PUBLICATIONS

Chinese Examination Report issued for Chinese Patent Application No. 201110220289.4, dated Aug. 5, 2013 with partial English Translation.

* cited by examiner 1
2
20
CONTROLLER
C2
6
Pe
W2
Pm
4
5
B2
8
7
9
3
MG
12
C3
11
14a
13
14
W1
C1
B1

FIG. 2

| | B1 | B2 | C1 | C2 | C3 |
|---|---|---|---|---|---|
| (a) ENGINE1 + MOTOR1 | | ○ | ○ | | |
| (b) ENGINE2 + MOTOR1 | | ○ | | ○ | |
| (c) ENGINE2 + MOTOR2 | | | | ○ | ○ |
| (d) ENGINE3 + MOTOR2 | ○ | | | | ○ |
| (e) ENGINE3 + MOTOR1 | ○ | ○ | | | |
| MOTOR1 | | ○ | | | |
| MOTOR2 | ○ | | | | ○ |
| ENGINE1 | | ○ | ○ | | |
| ENGINE2 | | | | ○ | |
| ENGINE3 | ○ | | | | |
| ELECTRIC POWER GENERATION DURING STOP | | | ○ | | |

VEHICULAR POWER TRANSMISSION DEVICE

CROSS REFERENCE TO RELATED APPLICATION

This application is based on and incorporates herein by reference Japanese Patent Application No. 2010-171882 filed on Jul. 30, 2010.

BACKGROUND OF THE INVENTION

1. Field of the Invention

The present invention relates to a power transmission device for a vehicle.

2. Description of Related Art

Patent document 1 (JP-A-2009-1234) describes a technology for controlling a reduction gear ratio of an engine and a reduction gear ratio of an electric motor by using a planetary gear mechanism as a technology of a power transmission device of a hybrid vehicle.

According to the technology of Patent document 1, a correspondence relationship between the reduction gear ratio of the engine and the reduction gear ratio of the electric motor is fixed. That is, if the reduction gear ratio of the engine is decided, the reduction gear ratio of the electric motor is also decided to be unique. Therefore, it is impossible to select efficient operating conditions of the engine and the electric motor individually.

SUMMARY OF THE INVENTION

It is an object of the present invention to enable setting efficient operating conditions of an engine and a motor individually by making a correspondence relationship between a reduction gear ratio of the engine and a reduction gear ratio of the motor variable in a technology for controlling the reduction gear ratio of the engine and the reduction gear ratio of the motor using a planetary gear mechanism.

According to a first example aspect of the present invention, a vehicular power transmission device is used for a vehicle having an engine and a motor for generating power for running. The vehicular power transmission device has a first planetary gear mechanism, a second planetary gear mechanism, an engine input shaft, a motor input shaft, an output mechanism, a plurality of first restriction mechanisms, and a plurality of second restriction mechanisms. The first planetary gear mechanism has three rotation members of a sun gear, a carrier and a ring gear. The second planetary gear mechanism has three rotation members of a sun gear, a carrier and a ring gear. The power generated by the engine is inputted to the engine input shaft, and the engine input shaft inputs the power of the engine to a first engine side rotation member among the three rotation members of the first planetary gear mechanism. The power generated by the motor is inputted to the motor input shaft, and the motor input shaft inputs the power of the motor to a first motor side rotation member among the three rotation members of the second planetary gear mechanism. The output mechanism combines power from a second engine side rotation member among the three rotation members of the first planetary gear mechanism and power from a second motor side rotation member among the three rotation members of the second planetary gear mechanism and transmits the combined power to an axle of driving wheels of the vehicle. The plurality of first restriction mechanisms are capable of restricting rotation of a third engine side rotation member among the three rotation members of the first planetary gear mechanism with different mechanisms respectively. The plurality of second restriction mechanisms are capable of restricting rotation of a third motor side rotation member among the three rotation members of the second planetary gear mechanism with different mechanisms respectively.

In this way, if the power generated by the engine is inputted to the first engine side rotation member of the first planetary gear mechanism and the power generated by the motor is inputted to the first motor side rotation member of the second planetary gear mechanism and if the power from second engine side rotation member of the first planetary gear mechanism and the power from the second motor side rotation member of the second planetary gear mechanism are combined and transmitted to the axle of the driving wheels, the rotation speed of the second engine side rotation member and the rotation speed of the second motor side rotation member restrict each other.

The reduction gear ratio between the input and the output of the first planetary gear mechanism can be switched by switching the used first restriction mechanism among the multiple first restriction mechanisms for the first planetary gear mechanism. Separately from this, the reduction gear ratio between the input and the output of the second planetary gear mechanism can be switched by switching the used second restriction mechanism among the second restriction mechanisms for the second planetary gear mechanism. Therefore, the correspondence relationship between the reduction gear ratio of the engine and the reduction gear ratio of the motor can be made variable.

According to a second example aspect of the present invention, a vehicular power transmission device is used for a vehicle having an engine and a motor for generating power for running. The vehicular power transmission device has a first planetary gear mechanism, a second planetary gear mechanism, an engine input shaft, a motor input shaft, an output mechanism, and a restriction mechanism section. The first planetary gear mechanism has three rotation members of a sun gear, a carrier and a ring gear. The second planetary gear mechanism has three rotation members of a sun gear, a carrier and a ring gear. The power generated by the engine is inputted to the engine input shaft, and the engine input shaft inputs the power of the engine to a first engine side rotation member among the three rotation members of the first planetary gear mechanism. The power generated by the motor is inputted to the motor input shaft, and the motor input shaft inputs the power of the motor to a first motor side rotation member among the three rotation members of the second planetary gear mechanism. The output mechanism combines power from a second engine side rotation member among the three rotation members of the first planetary gear mechanism and power from a second motor side rotation member among the three rotation members of the second planetary gear mechanism and transmits the combined power to an axle of driving wheels of the vehicle. The restriction mechanism section restricts rotation conditions of the first planetary gear mechanism and the second planetary gear mechanism. The vehicular power transmission device is structured to be able to set a reduction gear ratio on the engine side and a reduction gear ratio on the motor side independently from each other by controlling the restriction mechanism section.

In this way, if the power generated by the engine is inputted to the first engine side rotation member of the first planetary gear mechanism and the power generated by the motor is inputted to the first motor side rotation member of the second planetary gear mechanism and if the power from second engine side rotation member of the first planetary gear mechanism and the power from the second motor side rotation member of the second planetary gear mechanism are combined and transmitted to the axle of the driving wheels, the rotation speed of the second engine side rotation member and the rotation speed of the second motor side rotation member restrict each other.

The reduction gear ratio on the engine side and the reduction gear ratio on the motor side can be set independently from each other by controlling the restriction mechanism section. Therefore, the correspondence relationship between the reduction gear ratio of the engine and the reduction gear ratio of the motor can be made variable.

According to a third example aspect of the present invention, the restriction mechanism section has a plurality of first restriction mechanisms capable of restricting rotation of a third engine side rotation member among the three rotation members of the first planetary gear mechanism with different mechanisms respectively and a plurality of second restriction mechanisms capable of restricting rotation of a third motor side rotation member among the three rotation members of the second planetary gear mechanism with different mechanisms respectively.

According to a fourth example aspect of the present invention, the first engine side rotation member is the carrier, the second engine side rotation member is the ring gear, and the third engine side rotation member is the sun gear in the first planetary gear mechanism. The first motor side rotation member is the sun gear, the second motor side rotation member is the carrier, and the third motor side rotation member is the ring gear in the second planetary gear mechanism.

With such the construction, slowing down, direct coupling and speeding up of the rotation speed of the engine are possible. As for the motor, direct coupling and slowing down can be performed.

According to a fifth example aspect of the present invention, one of the first restriction mechanisms is a first clutch for conforming rotation speed of the third engine side rotation member of the first planetary gear mechanism to rotation speed of the first motor side rotation member of the second planetary gear mechanism. Another one of the first restriction mechanisms is a second clutch for conforming rotation speed of the third engine side rotation member of the first planetary gear mechanism to rotation speed of the first engine side rotation member and the second engine side rotation member.

According to a sixth example aspect of the present invention, further one of the first restriction mechanisms is a first brake for slowing down rotation of the third engine side rotation member of the first planetary gear mechanism with a fixed member.

According to a seventh example aspect of the present invention, one of the second restriction mechanisms is a second brake for slowing down rotation of the third motor side rotation member of the second planetary gear mechanism with another fixed member. Another one of the second restriction mechanisms is a third clutch for conforming rotation speed of the third motor side rotation member of the second planetary gear mechanism to rotation speed of the first motor side rotation member and the second motor side rotation member.

According to an eighth example aspect of the present invention, the first engine side rotation member is the carrier, the second engine side rotation member is the ring gear, and the third engine side rotation member is the sun gear in the first planetary gear mechanism. The first motor side rotation member is the sun gear, the second motor side rotation member is the carrier, and the third motor side rotation member is the ring gear in the second planetary gear mechanism. One of the first restriction mechanisms is a first clutch for conforming rotation speed of the third engine side rotation member of the first planetary gear mechanism to rotation speed of the first motor side rotation member of the second planetary gear mechanism. Another one of the first restriction mechanisms is a second clutch for conforming rotation speed of the third engine side rotation member of the first planetary gear mechanism to rotation speed of the first engine side rotation member and the second engine side rotation member. Further one of the first restriction mechanisms is a first brake for slowing down rotation of the third engine side rotation member of the first planetary gear mechanism with a fixed member. One of the second restriction mechanisms is a second brake for slowing down rotation of the third motor side rotation member of the second planetary gear mechanism with another fixed member. Another one of the second restriction mechanisms is a third clutch for conforming rotation speed of the third motor side rotation member of the second planetary gear mechanism to rotation speed of the first motor side rotation member and the second motor side rotation member.

The vehicular power transmission device is configured to cancel the restriction by the first brake, to effect the restriction by the second brake, to engage the first clutch, to disengage the second clutch and to disengage the third clutch when the reduction gear ratio of the engine is set at a first engine reduction gear ratio and the reduction gear ratio of the motor is set at a first motor reduction gear ratio. The vehicular power transmission device is configured to cancel the restriction by the first brake, to effect the restriction by the second brake, to disengage the first clutch, to engage the second clutch and to disengage the third clutch when the reduction gear ratio of the engine is set at a second engine reduction gear ratio smaller than the first engine reduction gear ratio and the reduction gear ratio of the motor is set at the first motor reduction gear ratio. The vehicular power transmission device is configured to cancel the restriction by the first brake, to cancel the restriction by the second brake, to disengage the first clutch, to engage the second clutch and to engage the third clutch when the reduction gear ratio of the engine is set at the second engine reduction gear ratio and the reduction gear ratio of the motor is set at a second motor reduction gear ratio smaller than the first motor reduction gear ratio. The vehicular power transmission device is configured to effect the restriction by the first brake, to cancel the restriction by the second brake, to disengage the first clutch, to disengage the second clutch and to engage the third clutch when the reduction gear ratio of the engine is set at a third engine reduction gear ratio smaller than the second engine reduction gear ratio and the reduction gear ratio of the motor is set at the second motor reduction gear ratio. The vehicular power transmission device is configured to effect the restriction by the first brake, to effect the restriction by the second brake, to disengage the first clutch, to disengage the second clutch and to disengage the third clutch when the reduction gear ratio of the engine is set at the third engine reduction gear ratio and the reduction gear ratio of the motor is set at the first motor reduction gear ratio.

With such the construction, various combinations between the first to third engine reduction gear ratios and the first and second motor reduction gear ratios can be realized.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

FIG. 2 is a diagram showing a correspondence relationship between reduction gear ratios of an engine and a motor and states of brakes and clutches according to the embodiment;

DETAILED DESCRIPTION OF EXAMPLE EMBODIMENT

Figure 1:
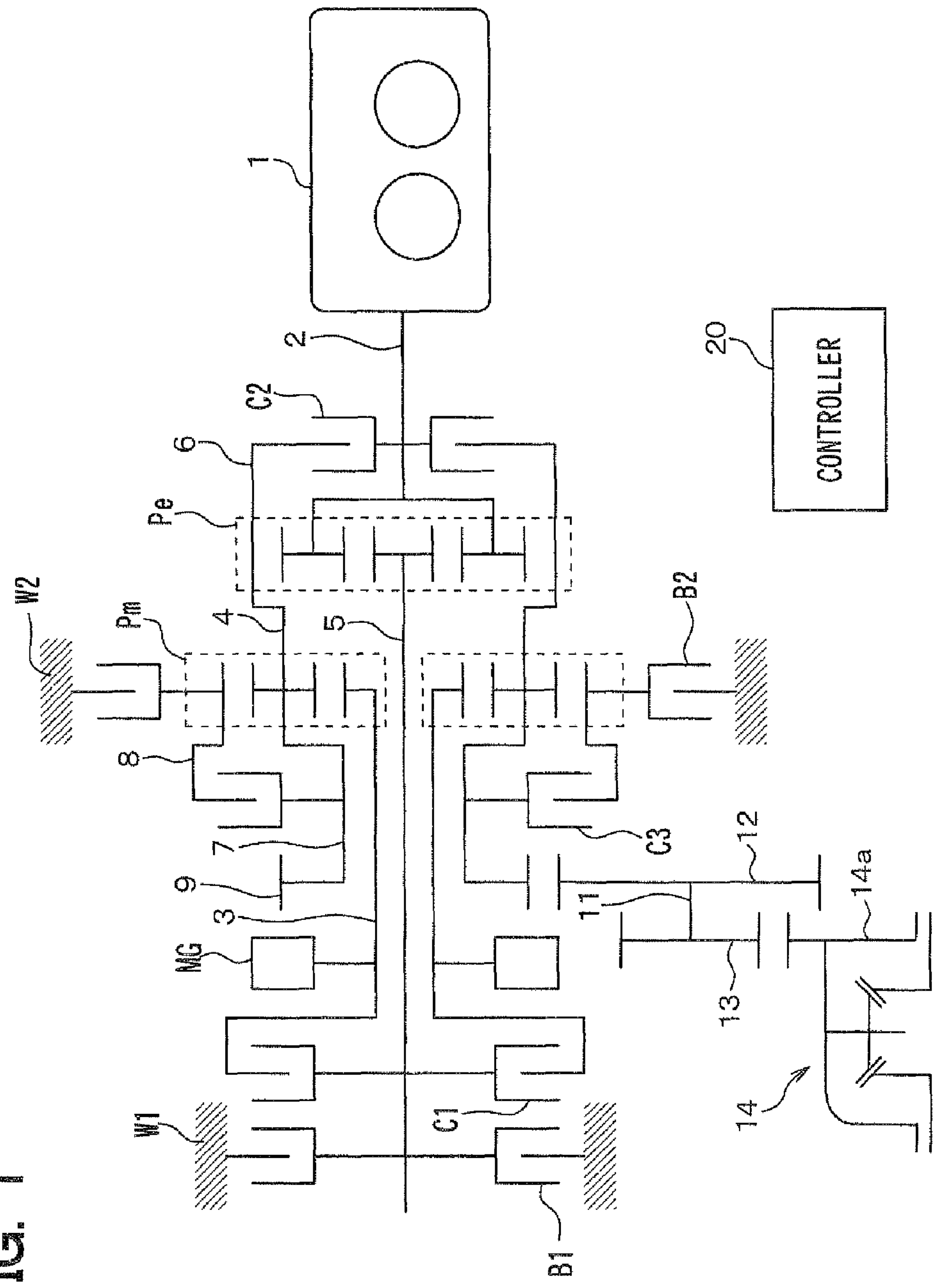
FIG. 1 is a skeleton diagram showing a construction of a vehicular power transmission device according to an embodiment of the present invention.

Hereinafter, an embodiment of the present invention will be described. FIG. 1 is a skeleton diagram showing a construction of a vehicular power transmission device according to the present embodiment. The vehicular power transmission device has an engine 1, which is an internal combustion engine, and a motor MG driven with an electric power of a battery, which is a secondary battery, as power generation devices for generating power for running a hybrid vehicle.

Further, the vehicular power transmission device has a first planetary gear mechanism Pe, to which the power generated by the engine 1 is inputted, and a second planetary gear mechanism Pm, to which the power generated by the motor MG is inputted. Each of the first planetary gear mechanism Pe and the second planetary gear mechanism Pm is a well-known gear mechanism having three well-known rotation members of a sun gear, a carrier and a ring gear.

In the first planetary gear mechanism Pe, the carrier corresponds to an example of the first engine side rotation member, the ring gear corresponds to an example of the second engine side rotation member, and the sun gear corresponds to an example of the third engine side rotation member. In the second planetary gear mechanism Pm, the sun gear corresponds to an example of the first motor side rotation member, the carrier corresponds to an example of the second motor side rotation member, and the ring gear corresponds to an example of the third motor side rotation member.

The vehicular power transmission device has an engine input shaft 2, a motor input shaft 3, a first transmission shaft 4, a second transmission shaft 5, a third transmission shaft 6, a fourth transmission shaft 7, a fifth transmission shaft 8, a counter drive gear 9, a first brake B1, a second brake B2, a first clutch C1, a second clutch C2, and a third clutch C3.

One end of the engine input shaft 2 is connected to the engine 1 and the other end of the engine input shaft 2 is connected to the carrier of the first planetary gear mechanism Pe. Thus, the power generated by the engine 1 is inputted to the engine input shaft 2, and the power of the engine 1 is inputted to the carrier of the first planetary gear mechanism Pe.

The motor input shaft 3 is a cylindrical shaft and is connected to a rotor of the motor MG. One end of the motor input shaft 3 is connected to the sun gear of the second planetary gear mechanism Pm. Thus, the power generated by the motor MG is inputted to the motor input shaft 3, and the power of the motor MG is inputted to the sun gear of the second planetary gear mechanism Pm.

The first transmission shaft 4 is a cylindrical shaft. One end of the first transmission shaft 4 is connected to the ring gear of the first planetary gear mechanism Pe, and the other end of the first transmission shaft 4 is connected to the carrier of the second planetary gear mechanism Pm. Thus, the first transmission shaft 4 connects the ring gear of the first planetary gear mechanism Pe and the carrier of the second planetary gear mechanism Pm with each other. Thus, rotation speed of the ring gear of the first planetary gear mechanism Pe and rotation speed of the carrier of the second planetary gear mechanism Pm restrict each other. More specifically, the rotation speed of the ring gear of the first planetary gear mechanism Pe coincides with the rotation speed of the carrier of the second planetary gear mechanism Pm.

One end of the second transmission shaft 5 is connected to the sun gear of the first planetary gear mechanism Pe, so the second transmission shaft 5 rotates integrally with the sun gear of the first planetary gear mechanism Pe.

The first brake B1 (corresponding to example of first restriction mechanism) is a well-known brake device (e.g., multi-plate brake) attached between the second transmission shaft 5 and a fixed member W1 fixed to a vehicle body. The first brake B1 can restrict the rotation of the second transmission shaft 5 with respect to the fixed member W1. More specifically, when the first brake B1 is effected (i.e., actuated), the rotation of the second transmission shaft 5 is decelerated by the fixed member W1. When the brake B1 is released, the second transmission shaft 5 is not restricted by the fixed member W1 but can rotate. A deceleration method of the rotation of the second transmission shaft 5 by the fixed member W1 may be a deceleration method for decelerating the rotation speed of the second transmission shaft 5 to zero. Alternatively, the deceleration method may be a deceleration method for decelerating the rotation speed of the second transmission shaft 5 to a value larger than zero by applying a strong viscous resistance to the rotation of the second transmission shaft 5.

The second transmission shaft 5 is connected to the sun gear of the first planetary gear mechanism Pe as mentioned above. Therefore, the first brake B1 can restrict the rotation of the sun gear of the first planetary gear mechanism Pe by decelerating the rotation speed of the sun gear of the first planetary gear mechanism Pe by the fixed member W1.

The first clutch C1 (corresponding to example of first restriction mechanism) is a well-known clutch (e.g., multi-plate clutch) attached between the other end of the motor input shaft 3 and the second transmission shaft 5 for engaging and disengaging the motor input shaft 3 and the second transmission shaft 5.

The third transmission shaft 6 is a cylindrical shaft. One end of the third transmission shaft 6 is connected to the ring gear of the first planetary gear mechanism Pe, so the third transmission shaft 6 rotates integrally with the ring gear of the first planetary gear mechanism Pe.

The second clutch C2 (corresponding to example of first restriction mechanism) is a well-known clutch (e.g., multi-plate clutch) attached between the other end of the third transmission shaft 6 and the engine input shaft 2 for engaging and disengaging the third transmission shaft 6 and the engine input shaft 2.

The second brake B2 (corresponding to example of second restriction mechanism) is a well-known brake device (e.g., multi-plate brake) attached between the ring gear of the second planetary gear mechanism Pm and a fixed member W2 fixed to the vehicle body. The second brake B2 can restrict the rotation of the ring gear of the second planetary gear mechanism Pm with respect to the fixed member W2. More specifically, when the second brake B2 is effected (i.e., actuated), the rotation of the ring gear is decelerated by the fixed member W2. When the second brake B2 is released, the ring gear is not restricted by the fixed member W2 but can rotate. A deceleration method of the rotation of the ring gear by the fixed member W2 may be a deceleration method for decelerating the rotation speed of the ring gear to zero. Alternatively, the deceleration method may be a deceleration method for decelerating the rotation speed of the ring gear to a value larger than zero by applying a strong viscous resistance to the rotation of the ring gear.

The fourth transmission shaft 7 is a cylindrical shaft. One end of the fourth transmission shaft 7 is connected to the carrier of the second planetary gear mechanism Pm, so the fourth transmission shaft 7 rotates integrally with the carrier of the second planetary gear mechanism Pm.

The counter drive gear 9 is a gear connected to the other end of the fourth transmission shaft 7 and rotates integrally with the fourth transmission shaft 7.

The fifth transmission shaft 8 is a cylindrical shaft. One end of the fifth transmission shaft 8 is connected to the ring gear of the second planetary gear mechanism Pm, so the fifth transmission shaft 8 rotates integrally with the ring gear of the second planetary gear mechanism Pm.

The third clutch C3 (corresponding to example of second restriction mechanism) is a well-known clutch (e.g., multiplate clutch) attached between the fourth transmission shaft 7 and the other end of the fifth transmission shaft 8 for engaging and disengaging the fourth transmission shaft 7 and the other end of the fifth transmission shaft 8.

A counter shaft 11 is arranged parallel to the engine input shaft 2 and the second transmission shaft 5. That is, the counter shaft 11 is arranged parallel to central axis lines of the first planetary gear mechanism Pe and the second planetary gear mechanism Pm. A counter driven gear 12 is attached to an end of the counter shaft 11 on a right side in FIG. 1, i.e., an end on a side of the planetary gear mechanisms Pe, Pm, such that the counter driven gear 12 rotates integrally with the counter shaft 11.

The counter driven gear 12 meshes with the counter drive gear 9. An output gear 13 is attached to an end of the counter shaft 11 on a left side in FIG. 1, i.e., on a side opposite to the planetary gear mechanisms Pe, Pm. The output gear 13 meshes with a ring gear 14*a* of a differential gear 14. The differential gear 14 transmits the power received from the output gear 13 to an axle of driving wheels (not shown). Therefore, one or both of the power of the engine 1 and the power of the motor MG are transmitted to the axle of the driving wheels through the counter drive gear 9.

Therefore, the first transmission shaft 4, the fourth transmission shaft 7 and the counter drive gear 9 act as an output mechanism for combining the power from the ring gear of the first planetary gear mechanism Pe and the power from the carrier of the second planetary gear mechanism Pm and for transmitting the combined power to the axle of the driving wheels of the vehicle.

Next, arrangement of respective parts of the vehicular power transmission device will be explained supplementarily. The engine input shaft 2 and the second transmission shaft 5 are arranged coaxially. The first planetary gear mechanism Pe is arranged on the engine 1 side of the second planetary gear mechanism Pm. The second planetary gear mechanism Pm is arranged on the motor MG side of the first planetary gear mechanism Pe.

The first transmission shaft 4 is arranged coaxially with the second transmission shaft 5 to surround the second transmission shaft 5 at a position between the first planetary gear mechanism Pe and the second planetary gear mechanism Pm. The motor input shaft 3 is arranged coaxially with the second transmission shaft 5 to surround the second transmission shaft 5 on a side of the second planetary gear mechanism Pm opposite from the engine 1.

The fourth transmission shaft 7 is arranged coaxially with the motor input shaft 3 and the second transmission shaft 5 to surround the motor input shaft 3. The fifth transmission shaft 8 is arranged coaxially with the motor input shaft 3, the second transmission shaft 5 and the fourth transmission shaft 7 to surround the fourth transmission shaft 7.

The first clutch C1 is arranged on a side of the motor input shaft 3 opposite from the engine 1. The first brake B1 is arranged on a side of the motor input shaft 3 opposite from the engine 1. The first brake B1 is arranged at a farther position than the first clutch C1 from the motor MG. The second clutch C2 is arranged on the engine 1 side of the first planetary gear mechanism Pe. The third transmission shaft 6 is arranged coaxially with the engine input shaft 2 to surround the engine input shaft 2 at a position between the first planetary gear mechanism Pe and the second clutch C2.

The vehicular power transmission device has a controller 20. The controller 20 controls reduction gear ratios of the power generated by the engine 1 and the power generated by the motor MG by controlling driving/non-driving of the motor MG, the engagement/disengagement of the clutches C1-C3, and the actuation/release of the brakes B1, B2 based on various physical quantities obtained within the vehicle. An electronic control unit having a microcontroller, which executes programs, is used as the controller 20, for example.

More specifically, a vehicle speed signal indicating vehicle speed of the vehicle, an accelerator position signal indicating an accelerator position and the like are inputted to the controller 20. As the vehicle speed signal, a signal outputted from a wheel speed sensor mounted to each wheel is used. As the accelerator position signal, a signal outputted from an accelerator position sensor is used.

The controller 20 controls the reduction gear ratios of the power generated by the engine 1 and the power generated by the motor MG by switching the engagement/disengagement of the clutches C1-C3 and the actuation/release of the brakes B1, B2 based on the inputted signals. More specifically, the controller 20 switches between the engagement and the disengagement of the clutches C1-C3 by controlling operations of actuators (e.g., actuators for generating oil pressure for engaging/disengaging clutches) provided respectively for the clutches C1-C3 for realizing the corresponding engagement/disengagement. The controller 20 switches between the actuation and the release of the brakes B1, B2 by controlling operations of actuators (e.g., actuators for generating oil pressure) provided respectively for the brakes B1, B2 for realizing the corresponding actuation/release.

Next, various combinations of the reduction gear ratio of the engine 1 (reduction gear ratio between input and output of power of engine 1 in first planetary gear mechanism Pe) and the reduction gear ratio of the motor MG (reduction gear ratio between input and output of power of motor MG in second planetary gear mechanism Pm) as well as states of the clutches C1-C3 and the brakes B1, B2 for realizing the combinations will be explained.

FIG. 2 shows a correspondence relationship between the reduction gear ratios of the engine 1 and the motor MG and the states of the clutches C1-C3 and the brakes B1, B2. In FIG. 2, each circle mark indicates the engagement of the clutch or the actuation of the brake. Hereafter, both of the engagement of the clutch and the actuation of the brake will be referred to simply as "ON." Each blank indicates the disengagement of the clutch or the release of the brake. Hereafter, both of the disengagement of the clutch and the release of the brake will be referred to simply as "OFF."

In following explanation, reference will be made to FIGS. 3A to 3E and FIGS. 4A to 4E. FIGS. 3A to 3E show engagement relationships between the first planetary gear mechanism Pe and the second planetary gear mechanism Pm. FIGS. 4A to 4E are collinear diagrams showing the states of the first planetary gear mechanism Pe and the second planetary gear mechanism Pm.

In FIGS. 3A to 3E, signs Se, Ce, Re represent the sun gear, the carrier and the ring gear of the first planetary gear mechanism Pe respectively. Signs Sm, Cm, Rm represent the sun gear, the carrier and the ring gear of the second planetary gear mechanism Pm respectively. In FIGS. 4A to 4E, the vertical axis represents the rotation speed, and signs Se, Ce, Re of the horizontal axis represent the sun gear, the carrier and the ring gear of the first planetary gear mechanism Pe respectively. Signs Sm, Cm, Rm of the horizontal axis represent the sun gear, the carrier and the ring gear of the second planetary gear mechanism Pm respectively.

In FIGS. 4A to 4E, the signs Cm, Re are placed at the same position because the rotation speeds of the ring gear of the first planetary gear mechanism Pe and the carrier of the second planetary gear mechanism Pm connected through the first transmission shaft 4 are the same. The signs Sm, Se are placed at the same position for simplicity. Even if the signs Sm, Se are placed at different positions, characteristics explained below are the same.

(a) Engine First Gear and Motor First Gear Mode

When the reduction gear ratio of the engine 1 is set at a first engine reduction gear ratio and the reduction gear ratio of the motor MG is set at a first motor reduction gear ratio, the controller 20 controls the second brake B2 and the first clutch C1 to ON and controls the first brake B1, the second clutch C2 and the third clutch C3 to OFF as shown in FIG. 2.

Figure 3A:
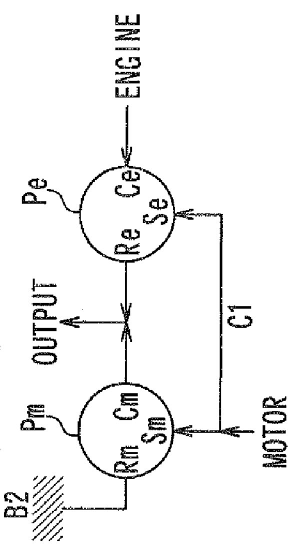
FIGS. 3A to 3E are diagrams showing engagement relationships of a first planetary gear mechanism and a second planetary gear mechanism according to the embodiment.

With such the control, as shown in FIG. 3A, the power generated by the engine 1 is inputted to the carrier of the first planetary gear mechanism Pe through the engine input shaft 2. The power generated by the motor MG is inputted to the sun gear of the second planetary gear mechanism Pm through the motor input shaft 3. In addition, since the clutch C1 is engaged, the rotation speed of the sun gear of the first planetary gear mechanism Pe coincides with the rotation speed of the sun gear of the second planetary gear mechanism Pm, and torque is transmitted also to the sun gear of the first planetary gear mechanism Pe through the motor input shaft 3, the engine 1 and the second transmission shaft 5. The rotation of the ring gear of the second planetary gear mechanism Pm is restricted by the second brake B2. Here, it is assumed that the rotation speed of the ring gear of the second planetary gear mechanism Pm is zero.

Figure 4A:
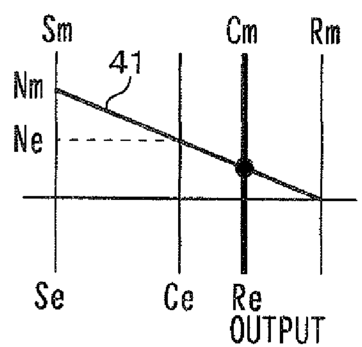
FIGS. 4A to 4E are collinear diagrams showing states of the first planetary gear mechanism and the second planetary gear mechanism according to the embodiment.

Since Rm is zero as shown in the collinear diagram of FIG. 4A, a straight line 41 indicating the state of the second planetary gear mechanism Pm is decided if the rotation speed Nm of the motor MG is decided. The rotation speed of Cm is also decided according to the straight line 41.

Since the rotation speeds of Cm and Re are the same and the rotation speeds of Sm and Se are the same, a straight line indicating the state of the first planetary gear mechanism Pe also coincides with the straight line 41. The rotation speed Ne of the engine 1 inputted to Ce is decided according to the straight line 41.

(b) Engine Second Gear and Motor First Gear Mode

When the reduction gear ratio of the engine 1 is set at a second engine reduction gear ratio smaller than the first engine reduction gear ratio and the reduction gear ratio of the motor MG is set at the first motor reduction gear ratio, the controller 20 controls the second brake B2 and the second clutch C2 to ON and controls the first brake B1, the first clutch C1 and the third clutch C3 to OFF as shown in FIG. 2.

Figure 3B:
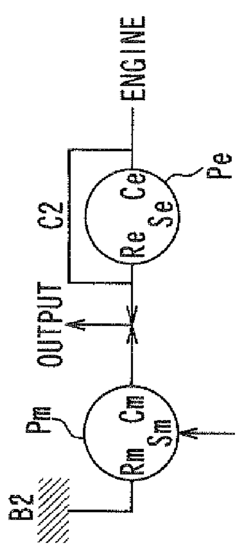

With such the control, as shown in FIG. 3B, the power generated by the engine 1 is inputted to the carrier of the first planetary gear mechanism Pe through the engine input shaft 2 and is inputted also to the ring gear of the first planetary gear mechanism Pe through the engine input shaft 2, the second clutch C2 and the third transmission shaft 6. Accordingly, the rotation speeds of the carrier and the ring gear of the first planetary gear mechanism Pe are the same. The rotation of the sun gear of the first planetary gear mechanism Pe receives no restriction from an outside of the first planetary gear mechanism Pe. The engagement relationship of the second planetary gear mechanism Pm is the same as the above-described (a) engine first gear and motor first gear mode.

Figure 4D:
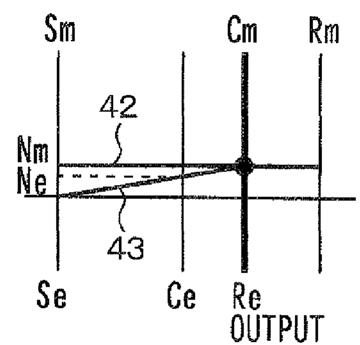
Figure 4B:
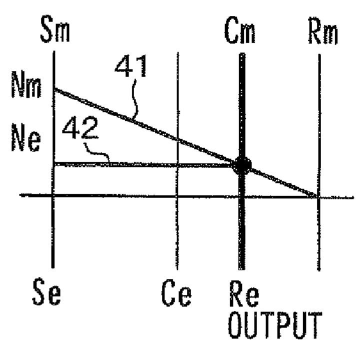
Figure 4E:
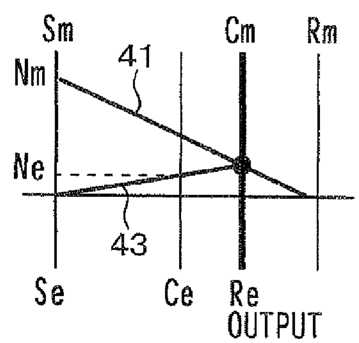

Therefore, in the collinear diagram of FIG. 4B, the straight line 41 indicating the state of the second planetary gear mechanism Pm is the same as the above-described (a) engine first gear and motor first gear mode. The rotation speed of Re of the first planetary gear mechanism Pe is decided according to the straight line 41. Since the rotation speed is the same between Re and Ce, the straight line 42 indicating the state of the first planetary gear mechanism Pe is horizontal. The rotation speed Ne of the engine 1 inputted to Ce is decided according to the straight line 42. Since the straight line 42 is closer to a horizontal line than the straight line 41, the rotation speed Ne is lower than the rotation speed Ne in the case of the above-described (a) engine first gear and motor first gear mode. Therefore, the second engine reduction gear ratio in this case is surely smaller than the first engine reduction gear ratio.

(c) Engine Second Gear and Motor Second Gear Mode

When the reduction gear ratio of the engine 1 is set at the second engine reduction gear ratio and the reduction gear ratio of the motor MG is set at a second motor reduction gear ratio smaller than the first motor reduction gear ratio, the controller 20 controls the second clutch C2 and the third clutch C3 to ON and controls the first brake B1, the second brake B2 and the first clutch C1 to OFF as shown in FIG. 2.

Figure 3C:
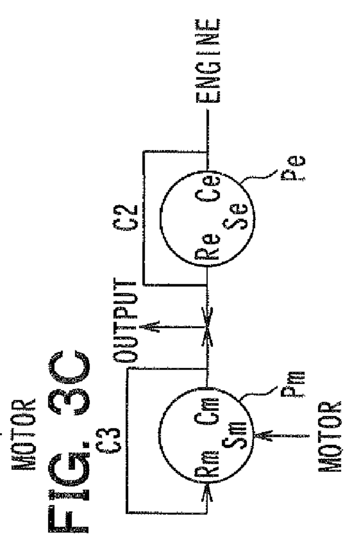

In this case, the engagement relationship of the first planetary gear mechanism Pe is the same as the above-described (b) engine second gear and motor first gear mode. As for the engagement relationship of the second planetary gear mechanism Pm, as shown in FIG. 3C, the power generated by the motor MG is inputted to the sun gear of the second planetary gear mechanism Pm through the motor input shaft 3. The carrier and the ring gear of the second planetary gear mechanism Pm engage with each other through the fifth transmission shaft 8, the third clutch C3 and the fourth transmission shaft 7. Therefore, the rotation speeds of the carrier and the ring gear of the second planetary gear mechanism Pm are the same.

Figure 4C:
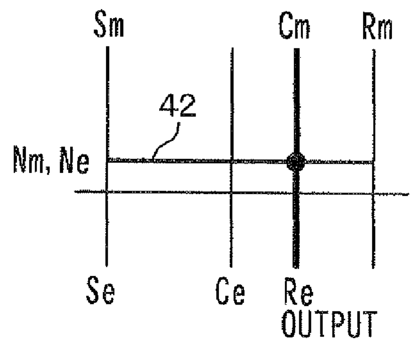
Figure 5A:
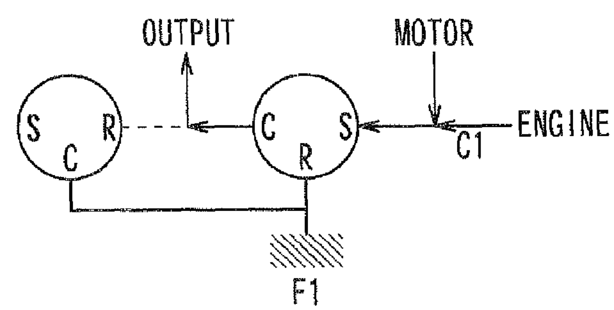
FIGS. 5A to 5D are diagrams showing engagement relationships of a first planetary gear mechanism and a second planetary gear mechanism of a prior art.
Figure 5B:
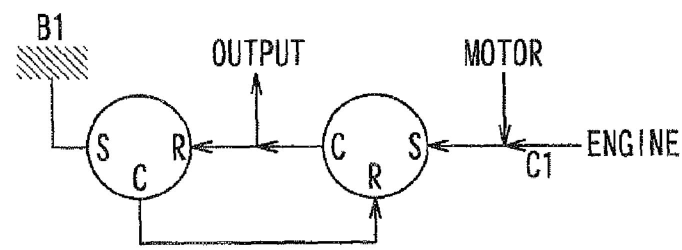
Figure 5C:
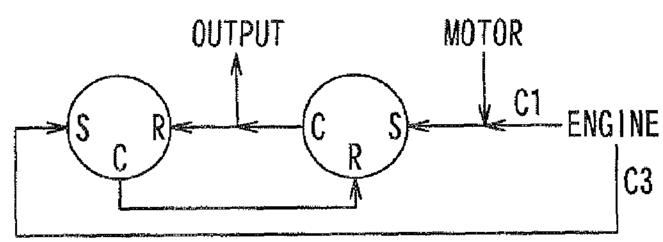
Figure 5D:
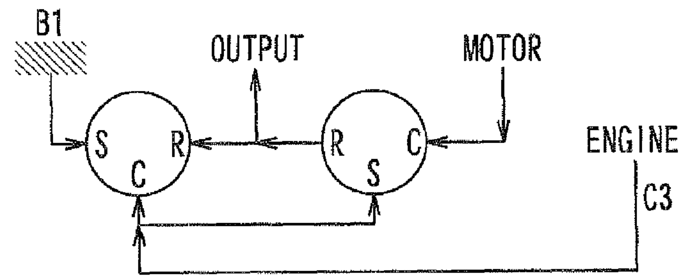

Therefore, as shown in the collinear diagram of FIG. 4C, both of the straight line indicating the state of the first planetary gear mechanism Pe and the straight line indicating the state of the second planetary gear mechanism Pm turn into the same horizontal straight line 42. Therefore, the rotation speed Ne of the engine 1 is the same as in the case of the above-described (b) engine second gear and motor first gear mode. The rotation speed Nm of the motor MG is lower than in the case of the above-described (b) engine second gear and motor first gear mode. Therefore, the second motor reduction gear ratio in this case is surely smaller than the first motor reduction gear ratio.

(d) Engine Third Gear and Motor Second Gear Mode

When the reduction gear ratio of the engine 1 is set at a third engine reduction gear ratio smaller than the second engine reduction gear ratio and the reduction gear ratio of the motor MG is set at the second motor reduction gear ratio, the controller 20 controls the first brake B1 and the third clutch C3 to ON and controls the second brake B2, the first clutch C1 and the second clutch C2 to OFF as shown in FIG. 2.

Figure 3D:
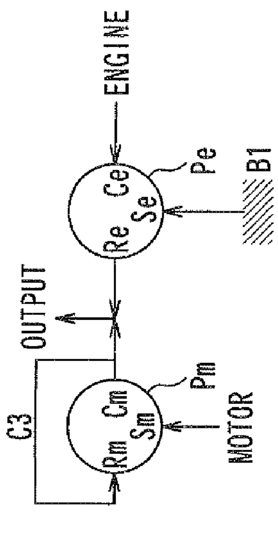

In this case, the engagement relationship of the second planetary gear mechanism Pm is the same as in the case of the above-described (c) engine second gear and motor second gear mode. As for the first planetary gear mechanism Pe, as shown in FIG. 3D, the power generated by the engine 1 is inputted to the carrier of the first planetary gear mechanism Pe through the engine input shaft 2, and the rotation of the sun gear of the first planetary gear mechanism Pe is restricted by the first brake B1. Here, it is assumed that the rotation speed of the sun gear of the first planetary gear mechanism Pe is zero.

Therefore, as shown in the collinear diagram of FIG. 4D, the straight line 42 indicating the state of the second planetary gear mechanism Pm is the same as in the case of the above-described (c) engine second gear and motor second gear mode. However, a straight line indicating the state of the first planetary gear mechanism Pe turns into a diagonally right up straight line 43 since Se is zero and Re and Cm are the same. The rotation speed Ne of the engine 1 inputted to Ce is decided according to the straight line 43. Since the straight line is diagonally right up, the rotation speed Ne is smaller than the rotation speed outputted to the axle of the driving wheels (i.e., rotation speed of Re). That is, the rotation of the engine 1 is sped up in the first planetary gear mechanism Pe. Therefore, the third engine reduction gear ratio in this case is surely smaller than the second engine reduction gear ratio.

(e) Engine Third Gear and Motor First Gear Mode

When the reduction gear ratio of the engine 1 is set at the third engine reduction gear ratio and the reduction gear ratio of the motor MG is set at the first motor reduction gear ratio, the controller 20 controls the first brake B1 and the second brake B2 to ON and controls the first clutch C1 the second clutch C2 and the third clutch C3 to OFF as shown in FIG. 2.

Figure 3E:
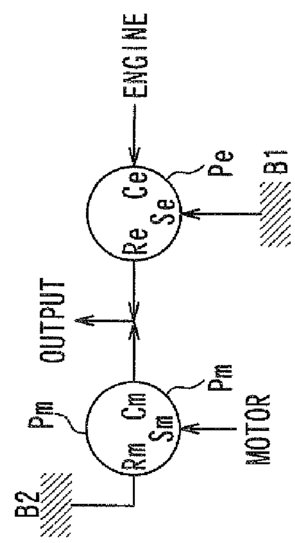

In this case, as shown in FIG. 3E, the engagement relationship of the first planetary gear mechanism Pe is the same as in the case of the above-described (d) engine third gear and motor second gear mode. The engagement relationship of the second planetary gear mechanism Pm is the same as in the case of the above-described (b) engine second gear and motor first gear mode.

In addition, an engine first gear and motor second gear mode can be also realized (not illustrated). More specifically, the engine first gear and motor second gear mode can be realized by controlling the first clutch C1 and the third clutch C3 to ON and controlling the second clutch C2, the first brake B1 and the second brake B2 to OFF.

As mentioned above, the power generated by the engine 1 and the power generated by the motor MG are transmitted to the axle of the driving wheels through the separate routes and the counter drive gear 9.

When the controller 20 controls the reduction gear ratio of the engine 1, the controller 20 maintains the state where the power of the engine 1 is inputted to the carrier of the first planetary gear mechanism Pe. Thus, when the first engine reduction gear ratio is realized, the controller 20 engages the first clutch C1 to restrict the rotation of the sun gear of the first planetary gear mechanism Pe with the mechanism that conforms the rotation speed of the sun gear of the first planetary gear mechanism Pe to the rotation speed of the sun gear of the second planetary gear mechanism Pm (line 8 of FIG. 2). When the second engine reduction gear ratio is realized, the controller 20 engages the second clutch C2 to restrict the rotation of the sun gear of the first planetary gear mechanism Pe with the mechanism that conforms the rotation speed of the sun gear of the first planetary gear mechanism Pe to the rotation speed of the carrier and the ring gear of the first planetary gear mechanism Pe (line 9 of FIG. 2). When the third engine reduction gear ratio is realized, the controller 20 actuates the first brake B1 to restrict the rotation of the sun gear of the first planetary gear mechanism Pe with the mechanism that decelerates the rotation of the sun gear of the first planetary gear mechanism Pe with the fixed member W1 (line 10 of FIG. 2).

When the controller 20 controls the reduction gear ratio of the motor MG, the controller 20 maintains the state where the power of the motor MG is inputted to the sun gear of the second planetary gear mechanism Pm separately (and independently) from the control of the first clutch C1, the second clutch C2 and the first brake B1. Thus, when the first motor reduction gear ratio is realized, the controller 20 actuates the second brake B2 to restrict the rotation of the ring gear of the second planetary gear mechanism Pm with the mechanism that decelerates the rotation speed of the ring gear of the second planetary gear mechanism Pm with the fixed member W2 (line 6 of FIG. 2). When the second motor reduction gear ratio is realized, the controller 20 engages the third clutch C3 to restrict the rotation of the ring gear of the second planetary gear mechanism Pm with the mechanism that conforms the rotation speed of the ring gear of the second planetary gear mechanism Pm to the rotation speed of the carrier of the second planetary gear mechanism Pm (line 7 of FIG. 2).

In this way, the reduction gear ratio between the input and the output of the first planetary gear mechanism Pe can be switched by switching the used first restriction mechanism among the multiple first restriction mechanisms C1, C2, B1 for the first planetary gear mechanism Pe. Separately from this, the reduction gear ratio between the input and the output of the second planetary gear mechanism Pm can be switched by switching the used second restriction mechanism among the second restriction mechanisms B2, C3 for the second planetary gear mechanism Pm. That is, the reduction gear ratio on the engine 1 side and the reduction gear ratio on the motor MG side can be set independently from each other by controlling the restriction mechanism section having the first clutch C1, the second clutch C2, the third clutch C3, the first brake B1 and the second brake B2. Accordingly, the correspondence relationship between the reduction gear ratio of the engine 1 and the reduction gear ratio of the motor MG can be made variable.

Since the speed change gear mechanism can be shared by the engine 1 and the motor MG, further reduction of the size can be realized and the optimum gears of the engine 1 and the motor MG can be selected respectively. Therefore, efficiency of the entire system of the vehicle can be improved.

In addition, the motor MG can be rotated with the power generated by the engine 1 to generate the electric power and to charge the battery during stop of the vehicle by controlling the first clutch C1 to ON and by controlling the first brake B1, the second brake B2, the second clutch C2 and the third clutch C3 to OFF as shown in the lowest line in FIG. 2. It is because the axle of the driving wheels does not rotate during the stop of the vehicle and the ring gear of the first planetary gear mechanism Pe is fixed, so the power of the engine 1 is slowed down by the first planetary gear mechanism Pe and is outputted from the sun gear of the first planetary gear mechanism Pe to be transmitted to the motor MG through the second transmission shaft 5, the first clutch C1 and the motor input shaft 3.

As a reference, combinations between the two reduction gear ratios and the engagement relationship of the planetary gear mechanisms in the vehicular power transmission device of Patent document 1 are shown in FIGS. 5A to 5D. FIGS. 5A to 5D show a first gear mode, a second gear mode, a third gear mode and a fourth gear mode respectively. As shown in FIGS. 5A to 5D, in the vehicular power transmission device of Patent document 1, the ring gear of one planetary gear mechanism and the carrier of the other planetary gear mechanism rotate invariably integrally. Further, the carrier of the one planetary gear mechanism and the ring gear of the other planetary gear mechanism rotate invariably integrally. Therefore, the states of both of the planetary gear mechanisms are indicated by the same straight line on the collinear diagram. As a result, the variation of the combination of the reduction gear ratios is limited. Accordingly, it is impossible to select the efficient operating conditions of the engine and the electric motor individually. As contrasted thereto, in the present embodiment, the efficient operating conditions of the engine and the motor can be set individually.

In addition, in the technology of Patent document 1, if the efficient operating condition of the engine is set during high-speed running, the rotation speed of the motor becomes excessively high. Therefore, it is necessary to restrict the engine rotation speed. As a result, the maximum speed during the high-speed running is decided by the rotation speed of the motor.

In contrast, in the present embodiment, the increase of the motor rotation speed during the high-speed running can be prevented and the running can be performed without restricting the engine rotation speed.

Figure 6:
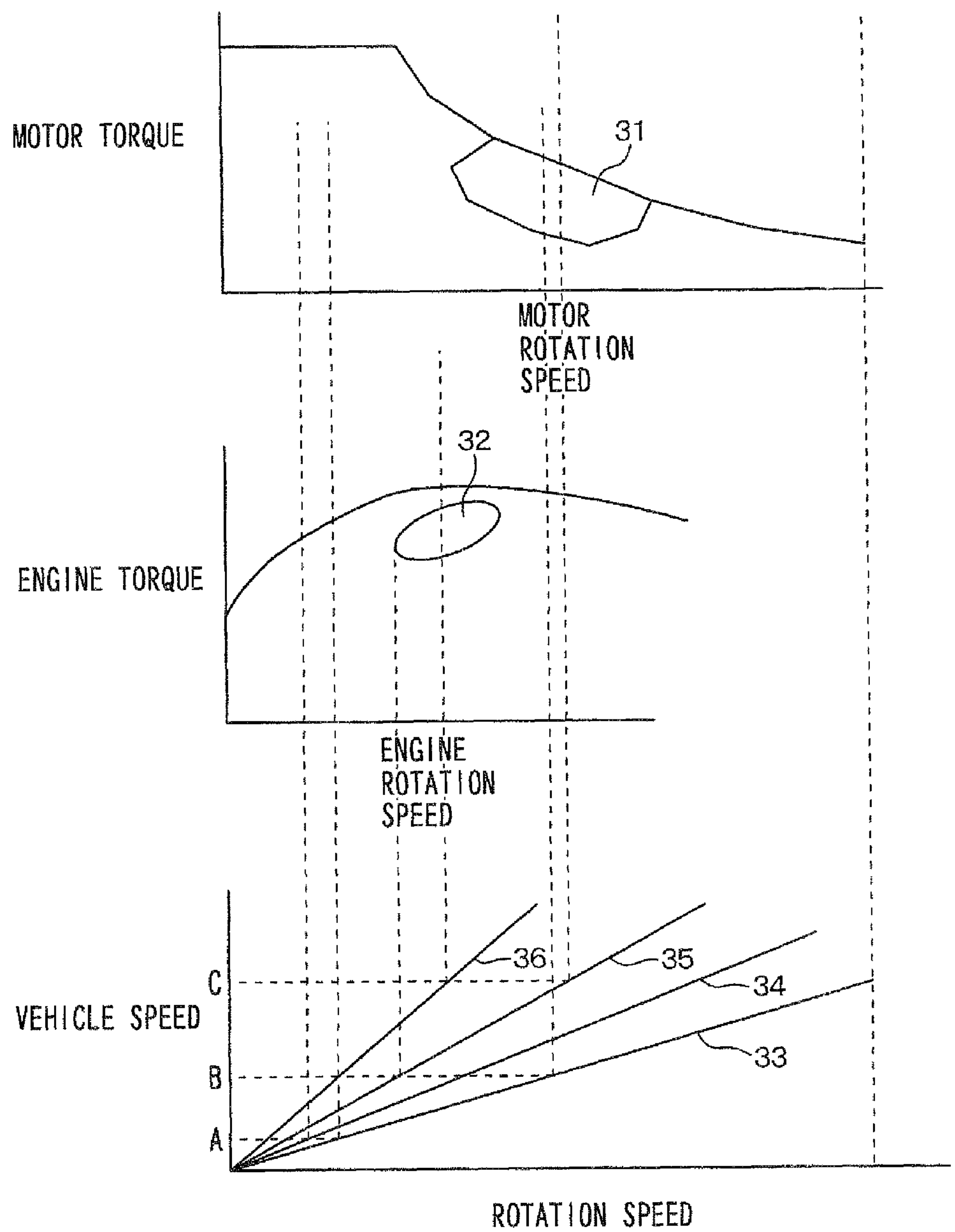
FIG. 6 is a diagram illustrating a relationship between vehicle speed and the optimum reduction gear ratios according to the embodiment.

Next, an example of the condition for selecting the combination of the reduction gear ratios and what kind of combination is selected by the controller 20 based on the condition will be explained. FIG. 6 shows a relationship between the running speed of the vehicle and the optimum reduction gear ratio of the example.

In FIG. 6, in the uppermost graph, a horizontal axis represents the rotation speed of the motor MG (for example, in terms of rpm). A vertical axis represents the motor torque of the motor MG. An area 31 shows an area where the efficiency of the motor MG (proportional to gas mileage of vehicle) is equal to or higher than a predetermined reference.

In the middle graph, a horizontal axis represents the rotation speed of the engine 1 (for example, in terms of rpm). A vertical axis represents the engine torque of the engine 1. An area 32 shows an area where the efficiency of the engine 1 (proportional to gas mileage of vehicle) is equal to or higher than a predetermined reference.

In the lowermost graph, a horizontal axis represents the rotation speeds of the motor MG and the engine 1, and a vertical axis represents the vehicle speed. A straight line 33 shows a relationship between the vehicle speed and the rotation speed of the motor MG at the first motor reduction gear ratio. A straight line 34 shows a relationship between the vehicle speed and the rotation speed of the engine 1 at the first engine reduction gear ratio. A straight line 35 shows a relationship between the vehicle speed and the rotation speeds of the engine 1 and the motor MG at the second engine reduction gear ratio and the second motor reduction gear ratio. A straight line 36 shows a relationship between the vehicle speed and the rotation speed of the engine 1 at the third engine reduction gear ratio.

As understood from the drawing, in a low-speed range of the vehicle speed A and its periphery, in order to bring the rotation speeds of the motor MG and the engine 1 as close as possible to the areas 31, 32, the controller 20 selects the combination of the first motor reduction gear ratio and the first engine reduction gear ratio, which are the largest reduction gear ratios.

In a middle-speed range of the vehicle speed B and its periphery, in order to bring the rotation speeds of the motor MG and the engine 1 as close as possible to the centers of the areas 31, 32, the controller 20 selects the combination of the first motor reduction gear ratio and the second engine reduction gear ratio.

In a high-speed range of the vehicle speed C and its periphery, in order to bring the rotation speeds of the motor MG and the engine 1 as close as possible to the centers of the areas 31, 32, the controller 20 selects the combination of the second motor reduction gear ratio and the third engine reduction gear ratio. The other combinations as mentioned above may be selected when needed.

Other Embodiments

The scope of the present invention should not be limited to the above-described embodiment. Rather, the scope of the present invention includes various forms capable of realizing the functions of components specifying the present invention. For example, following modes are included.

(1) In the above-described embodiment, in the first planetary gear mechanism Pe, the first engine side rotation member is the carrier, the second engine side rotation member is the ring gear, and the third engine side rotation member is the sun gear. In the second planetary gear mechanism Pm, the first motor side rotation member is the sun gear, the second motor side rotation member is the carrier, and the third motor side rotation member is the ring gear. With such the construction, the slowing down, the direct coupling, and the speeding up of the rotation speed of the engine are possible. The direct coupling and the slowing down of the rotation speed of the motor are possible.

However, the correspondence relationship between the first to third rotation members and the sun gear, the carrier and the ring gear in the first planetary gear mechanism Pe and the correspondence relationship between the first to third rotation members and the sun gear, the carrier and the ring gear in the second planetary gear mechanism Pm are not limited to the above.

(2) The third clutch C3 may be structured to engage/disengage the power transmission between the sun gear and the carrier of the second planetary gear mechanism Pm by engaging/disengaging the motor input shaft 3 and the fourth transmission shaft 7. Also in this case, the reduction gear ratios equal to those of the above-described embodiment can be realized by controlling the controller 20 in the same way as the above-described embodiment. For example, when the restriction of the second brake B2 is canceled and the third clutch C3 is engaged, the second reduction gear ratio of the motor MG is realized.

(3) The third clutch C3 may be structured to engage/disengage the power transmission between the sun gear and the ring gear of the second planetary gear mechanism Pm by engaging/disengaging the motor input shaft 3 and the fifth transmission shaft 8. Also in this case, the reduction gear ratios equal to those of the above-described embodiment can be realized by controlling the controller 20 in the same way as the above-described embodiment. For example, when the restriction of the second brake B2 is canceled and the third clutch C3 is engaged, the second reduction gear ratio of the motor MG is realized.

(4) The second clutch C2 may be structured to engage/disengage the power transmission between the sun gear and the carrier of the first planetary gear mechanism Pe by engaging/disengaging the engine input shaft 2 and the second transmission shaft 5. Also in this case, the reduction gear ratios equal to those of the above-described embodiment can be realized by controlling the controller 20 in the same way as the above-described embodiment. For example, when the restriction of the first brake B1 is canceled and the second clutch C2 is engaged, the second reduction gear ratio of the engine 1 is realized.

(5) The second clutch C2 may be structured to engage/disengage the power transmission between the sun gear and the ring gear of the first planetary gear mechanism Pe by engaging/disengaging the second transmission shaft 5 and the first transmission shaft 4. Also in this case, the reduction gear ratios equal to those of the above-described embodiment can be realized by controlling the controller 20 in the same way as the above-described embodiment. For example, when the restriction of the first brake B1 is canceled and the second clutch C2 is engaged, the second reduction gear ratio of the engine 1 is realized.

(6) The third clutch C3 may be structured to engage/disengage the power transmission between the sun gear and the carrier of the second planetary gear mechanism Pm by engaging/disengaging the motor input shaft 3 and the fourth transmission shaft 7 in the engine second gear and motor second gear mode. Also in this case, the second reduction gear ratio of the motor is realized when the restriction of the second brake B2 is canceled and the third clutch C3 is engaged.

(7) The third clutch C3 and the counter drive gear 9 may be connected directly to the first transmission shaft 4 instead of the fourth transmission shaft 7. Alternatively, either one of the third clutch C3 and the counter drive gear 9 may be connected directly to the first transmission shaft 4 instead of the fourth transmission shaft 7.

The present invention should not be limited to the disclosed embodiments, but may be implemented in many other ways without departing from the scope of the invention, as defined by the appended claims.

What is claimed is:

1. A vehicular power transmission device for a vehicle having an engine and a motor for generating power for running, the vehicular power transmission device comprising:

a first planetary gear mechanism having three rotation members of a sun gear, a carrier and a ring gear;

a second planetary gear mechanism having three rotation members of a sun gear, a carrier and a ring gear;

an engine input shaft, to which the power generated by the engine is inputted and which inputs the power of the engine to a first engine side rotation member among the three rotation members of the first planetary gear mechanism;

a motor input shaft, to which the power generated by the motor is inputted and which inputs the power of the motor to a first motor side rotation member among the three rotation members of the second planetary gear mechanism;

an output mechanism for combining power from a second engine side rotation member among the three rotation members of the first planetary gear mechanism and power from a second motor side rotation member among the three rotation members of the second planetary gear mechanism and for transmitting the combined power to an axle of driving wheels of the vehicle;

a plurality of first restriction mechanisms capable of restricting rotation of a third engine side rotation member among the three rotation members of the first planetary gear mechanism with different mechanisms respectively; and a plurality of second restriction mechanisms capable of restricting rotation of a third motor side rotation member among the three rotation members of the second planetary gear mechanism with different mechanisms respectively; wherein the first engine side rotation member is the carrier, the second engine side rotation member is the ring gear, and the third engine side rotation member is the sun gear in the first planetary gear mechanism, the first motor side rotation member is the sun gear, the second motor side rotation member is the carrier, and the third motor side rotation member is the ring gear in the second planetary gear mechanism, one of the first restriction mechanisms is a first clutch for conforming rotation speed of the third engine side rotation member of the first planetary gear mechanism to rotation speed of the first motor side rotation member of the second planetary gear mechanism, another one of the first restriction mechanisms is a second clutch for conforming rotation speed of the third engine side rotation member of the first planetary gear mechanism to rotation speed of the first engine side rotation member and the second engine side rotation member, further one of the first restriction mechanisms is a first brake for slowing down rotation of the third engine side rotation member of the first planetary gear mechanism with a fixed member, one of the second restriction mechanisms is a second brake for slowing down rotation of the third motor side rotation member of the second planetary gear mechanism with another fixed member, another one of the second restriction mechanisms is a third clutch for conforming rotation speed of the third motor side rotation member of the second planetary gear mechanism to rotation speed of the first motor side rotation member and the second motor side rotation member, the vehicular power transmission device is configured to cancel the restriction by the first brake, to effect the restriction by the second brake, to engage the first clutch, to disengage the second clutch and to disengage the third clutch when the reduction gear ratio of the engine is set at a first engine reduction gear ratio and the reduction gear ratio of the motor is set at a first motor reduction gear ratio, the vehicular power transmission device is configured to cancel the restriction by the first brake, to effect the restriction by the second brake, to disengage the first clutch, to engage the second clutch and to disengage the third clutch when the reduction gear ratio of the engine is set at a second engine reduction gear ratio smaller than the first engine reduction gear ratio and the reduction gear ratio of the motor is set at the first motor reduction gear ratio, the vehicular power transmission device is configured to cancel the restriction by the first brake, to cancel the restriction by the second brake, to disengage the first clutch, to engage the second clutch and to engage the third clutch when the reduction gear ratio of the engine is set at the second engine reduction gear ratio and the reduction gear ratio of the motor is set at a second motor reduction gear ratio smaller than the first motor reduction gear ratio, the vehicular power transmission device is configured to effect the restriction by the first brake, to cancel the restriction by the second brake, to disengage the first clutch, to disengage the second clutch and to engage the third clutch when the reduction gear ratio of the engine is set at a third engine reduction gear ratio smaller than the second engine reduction gear ratio and the reduction gear ratio of the motor is set at the second motor reduction gear ratio, and the vehicular power transmission device is configured to effect the restriction by the first brake, to effect the restriction by the second brake, to disengage the first clutch, to disengage the second clutch and to disengage the third clutch when the reduction gear ratio of the engine is set at the third engine reduction gear ratio and the reduction gear ratio of the motor is set at the first motor reduction gear ratio.

* * * * *